G. McFARLAND & C. F. LOOMIS.
TRACTOR.
APPLICATION FILED JULY 30, 1914.
1,222,557.
Patented Apr. 10, 1917
3 SHEETS—SHEET 1.
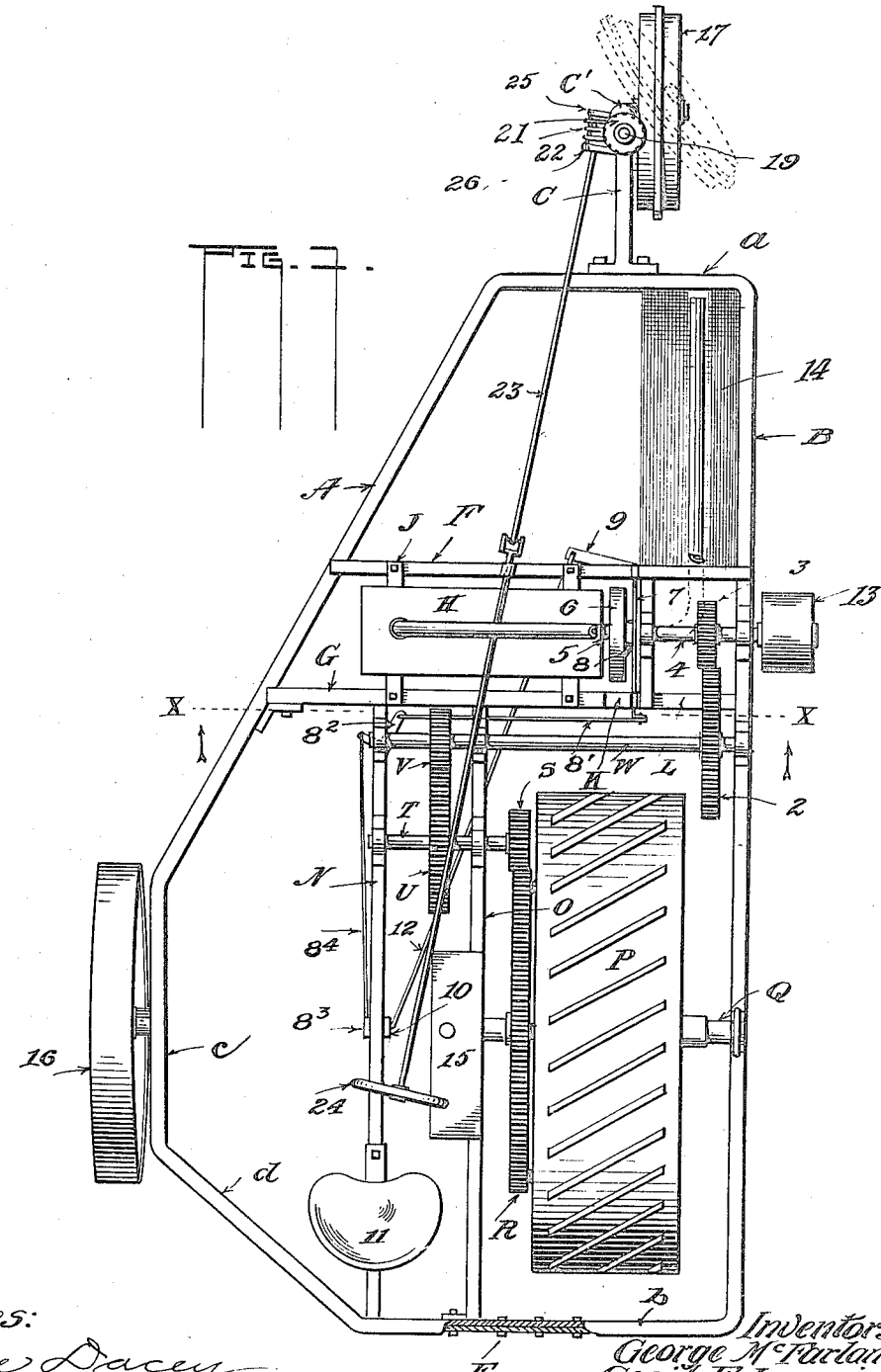
Witnesses:
Marie Dacey
Louise Masch
Inventors:
George McFarland,
Cecil F. Loomis,
By L. M. Thurlow,
Att'y

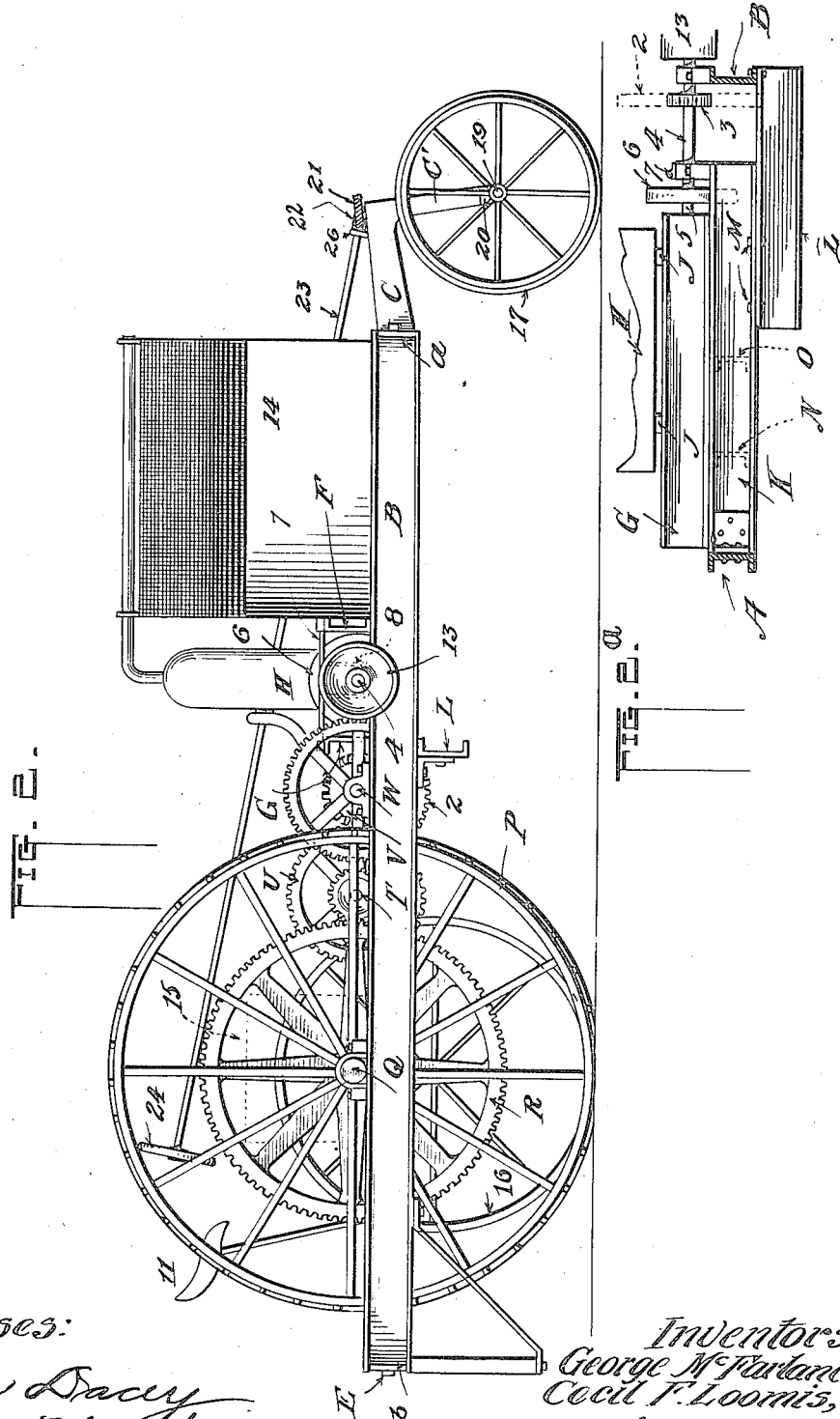

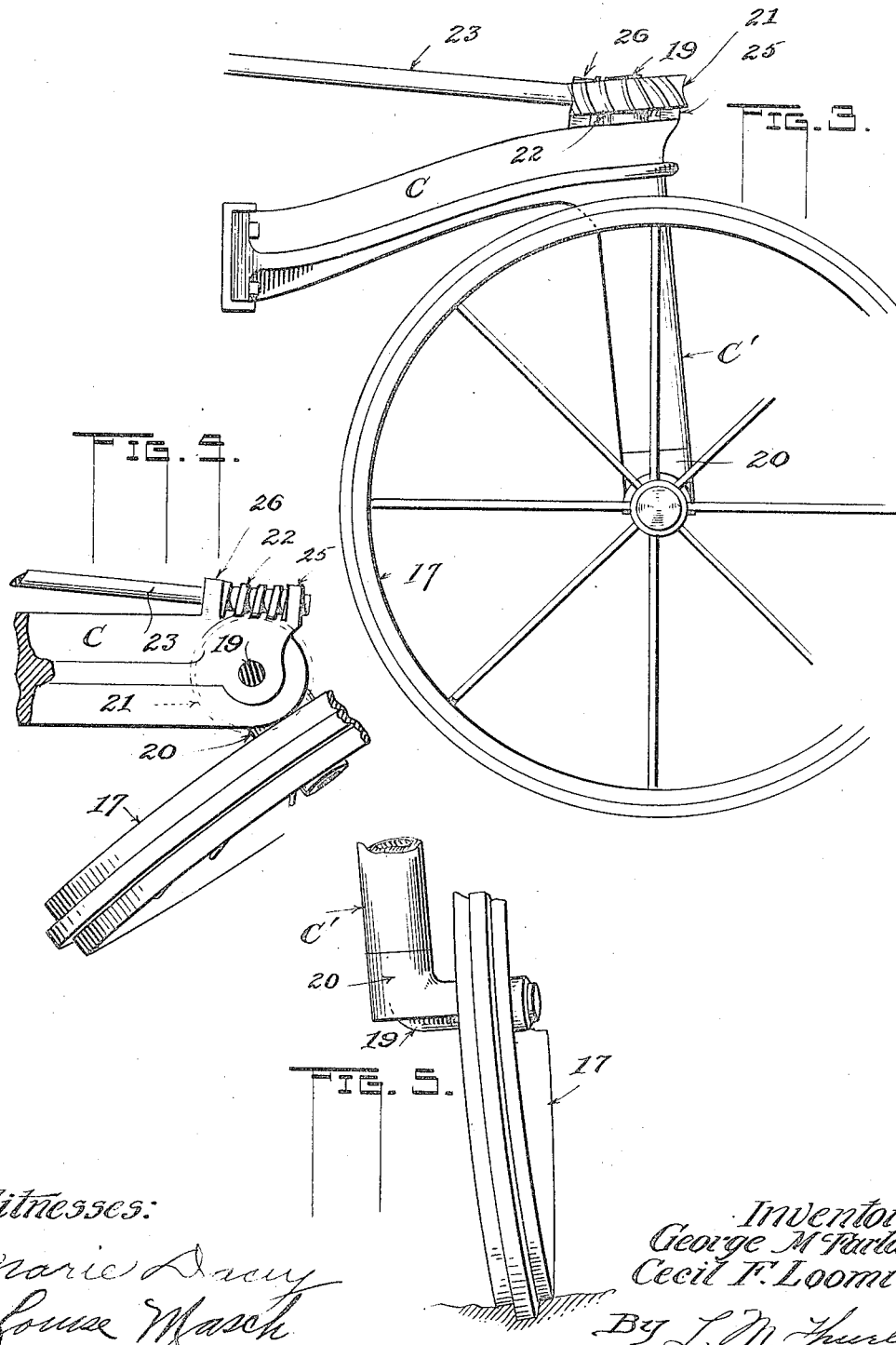

UNITED STATES PATENT OFFICE.

GEORGE McFARLAND AND CECIL F. LOOMIS, OF PEORIA, ILLINOIS.

TRACTOR.

1,222,557. Specification of Letters Patent. Patented Apr. 10, 1917.

Application filed July 30, 1914. Serial No. 854,176.

*To all whom it may concern:*

Be it known that we, GEORGE MCFARLAND and CECIL F. LOOMIS, citizens of the United States, residing at Peoria, in the county of Peoria and State of Illinois, have invented certain new and useful Improvements in Tractors; and we do hereby declare that the following is a full, clear, and exact description of the invention, which will enable others skilled in the art to which it appertains to make and use the same.

This invention relates to tractors. It pertains more particularly to the manner of disposing the driving gearing and motor upon a tractor of the three wheel type whereby to balance the weight of said gearing and motor upon the traction or bull-wheel.

One of the objects of the invention is to produce to a main frame of peculiar form for a tractor of the three wheeled type in that it will be at once very rigid, the least amount of material will be required in its construction thereby keeping the cost of production low, and the simplification of the operation of shaping into the form required.

The main object of the invention is to so dispose the weight of the machinery upon the frame of a three wheeled tractor with reference to its three carrying or ground-wheels that the guiding of the machine by means of the steering ground wheel will be very positive there being no tendency of the machine to swing about on its driving or traction wheel.

Another and important object is to dispose the various parts of the driving mechanism upon the frame in such a relation to the traction or "bull" wheel that a perfect balance of the machine will result with no tendency to turn about or deviate from a straight-ahead course. Also, to place the several gears of the reducing gear of the engine in such a position with regard to the entire weight placed upon the frame that the combined weights will be carried directly upon the said tractor wheel so as to obtain the largest amount of traction that can be realized.

Other objects and advantages with regard to structure will be brought out as the description proceeds.

In the accompanying drawings forming a part of this application—

Figure 1 is a plan of the complete tractor.

Fig. 2 is a side elevation of the same.

Fig. 2ᵃ is a transverse section of the frame and some of its mountings taken on line x—x of Fig. 1.

Fig. 3 is a side elevation of the front steering ground wheel showing an inclined supporting standard or pedestal for the same.

Fig. 4 is a plan of a portion of the same; and,

Fig. 5 is an elevation of a portion of the wheel and its standard or pedestal illustrating the position of the steering wheel in turning out of a straight course.

The main frame is composed of but a single length of channel steel which is bent at substantially the middle of its length in two places leaving a short transverse front portion $a$ and creating side portions A and B extending rearwardly the full length of the frame. The portion B is straight the full length of the completed frame and is bent parallel to the portion $a$ into the portion $b$. The opposite portion A extends from said transverse portion $a$ rearwardly and outwardly at an obtuse angle constantly increasing in distance from the portion B until it reaches the full width of the finished frame, the length of the angled portion being substantially two thirds of the length of the frame. Said portion A is then bent into a rearwardly extending portion $c$ parallel to the portion B, thence being bent at an obtuse angle and extending rearwardly toward the portion $b$ forming the portion $d$ which is connected with $b$, the ends of $d$ and $b$ being secured together by means of bolts E for example. This forms a substantially triangular frame that is at once strong and rigid, requiring the least amount of metal, and cheaply produced.

F is a brace of channel steel lying upon and extending transversely of the frame near the forward end and parallel to it is a similar brace G upon both of which is mounted the engine or motor H by means of cross members J, Figs. 1 and 2ᵃ. Said brace G extends but part way across the frame and it and the brace F lie above the top surface of the frame and are supported thereon. Since said brace G extends but part way across the frame a support is required for one of its ends which is furnished in a brace K lying beneath it and secured at the one end to the frame portion A, being bent at right angles forwardly at its outer end, its extremity being attached to the under side of the brace F. In addition, there is secured to the brace K at the end last mentioned a member L secured to it by bolts M said member L being secured to the frame portion B in any suitable manner. This peculiar construction aids in bracing the two frame members A and B besides sustaining the driving machinery of the tractor in the best possible position with regard to convenience, accessibility, and the disposition of the reversing mechanism and clutch portion all of which will appear presently.

Extending longitudinally of the machine is a brace N its ends having attachment to the rear end of the frame and the member G described. Parallel to said member N is a similar member O attached at its ends to the same members as said member N. P indicates the "bull" wheel whose axle Q is secured in any suitable manner at one end to the frame part B and whose other end is secured upon the member O just described, it being observed that the said wheel has a position close to one side of the frame, in this instance the right hand side.

Secured to the bull wheel is a ring gear R in mesh with which is a pinion S mounted upon a shaft T journaled across the members N O, said shaft carrying a gear U which meshes with a pinion V on a shaft W journaled on the members N O B. This shaft carries a large gear 2 in mesh with a pinion 3 on a shaft 4 axially coincident with the shaft 5 of the engine or motor H.

The train of gears thus provided admits of running the engine at a high rate of speed and delivering at the bull wheel great power due to the reduction or stepping down method.

6 is indicative of a clutch for connecting the shafts 4 and 5, and 7 is a rock shaft carrying a shifting fork 8 for shifting a part (not shown) of said clutch. This shaft is rocked by means of a rod 8' attached to a bell-crank lever 8² connected in turn with a hand lever 8³ through a rod 8⁴, the said lever 8³ being easy of access from the driver's seat. To this, however, we lay no claim to novelty.

The pinion 3 described is one of a reversing gear-set which we have not believed necessary to illustrate and by which the tractor may be reversed in its direction of advance in the field. 9 is a lever for operating said reversing gear-set through a lever 10 at the rear of the machine near the driver's seat 11, the two levers being connected by a rod 12. The shaft 4 is provided with a pulley 13 for driving any form of machinery from the engine when the tractor is to be used for that purpose.

14 is indicative of any usual or desired form of radiator for the cooling water for the engine and 15 is a fuel supply tank. The other parts for the motor have not been illustrated since they are not required for the understanding of the present invention.

16 is a ground wheel located opposite the bull wheel and preferably slightly canted at an angle outwardly which assists in a more perfect steering of the implement. Attention will now be directed to the front steering ground wheel which we consider of importance in the handling of the tractor.

In the several figures this wheel is indicated by the reference character 17, the frame being supported thereon through a hollow or tubular pedestal C' as part of the described arm C through which extends a shaft 19 whose lower end extends at right angles and carries said wheel, there being any suitable casting 20 for carrying the pedestal and protecting the wheel bearing.

The upper end of the shaft 19 has secured thereto a worm wheel 21 and a worm 22 on a steering rod 23 engaging it. The steering rod extends rearwardly to the driver's seat and is provided with any usual steering wheel 24. The pedestal is inclined at an angle forwardly so that its lower end lies ahead of its upper end. The pedestal is provided with extensions 25 and 26 forming bearings for the steering rod.

Due to the fact that the axis about which the wheel 17 turns is inclined in a forward direction, the said wheel when turned out on a straight ahead course in turning sidewise, or in turning a corner, the wheel must also take up an inclined position, its plane being inclined at an angle to the line of advance as indicated in Fig. 5, it being observed that the face of the wheel tends to bank upon the soil whereby a large surface engages the soil to resist a tendency to skid due to the drive or push from behind delivered by the traction wheel P.

When a steering ground wheel turns about a vertical axis its tendency is to skid for the reason that it does not have sufficient of its surface presented to the ground surface and to overcome this skidding tendency an extended rim is used from the wheel face but this has not been found to yield the proper results and, in consequence, we have devised the structure herein which is found in practice to prevent skidding and cause the machine to act more quickly in turning out of a straight ahead course. In addition to this advantage there is that of bringing that portion of the wheel which first meets obstructions into line with the axis of the pedestal and shaft 19 so that blows transmitted to the frame will tend to lift it rather than to fracture or snap the pedestal off as often happens when the latter occupies a vertical position.

Referring again to the mounting of the machine parts upon the frame, it is observed that the engine or motor H is placed forward of the bull wheel and close to it so that it and the gearing between it and the traction wheel is carried upon said wheel the wheel 16 acting little more than to support a slight weight of that side of the frame to which it is attached.

That is to say, the gearing made up of the gears 2 and 3 and gears V and U, also gears S and R, are all placed around the bull wheel in such a way that the whole, in effect, is balanced upon the traction wheel, all of the weights being distributed upon the frame with this end in view. The said traction wheel thus practically supports all of the weight and when the power is applied the weight is in effect lifted upon said wheel through the pinion S and the gear R to obtain the greatest traction possible.

The disposal of the weights on the three wheeled tractors is usually such that too great weight has been placed upon wheels other than the driving or traction wheel and the weight on those wheels therefore becomes a drag resulting in a tendency of the machine to turn around on the traction wheel, the latter acting as a pivot so that there is constant drag sidewise and an indifferent operation of the machine.

Now, by placing practically all of the weight on the traction wheel, the wheel 16 merely acting as a support for carrying but little weight, comparatively, the front caster wheel 17 has absolute control of the direction of movement; and by placing it directly ahead of said traction wheel there is no side swinging or pivoting tendency while a turn to the right or left of said steering wheel causes the machine to answer at once to that movement.

The rotation of the motor tends to lift the front end of the machine and place the weight thereof upon the axle of the bull-wheel for the reason that the pinion S has a tendency to climb upon the ring gear R in driving said bull-wheel. Therefore, with the disposal of the weights as described around the latter, the gearing V U S R being close to it, the motor being adjacent said wheel and in front of it, and the heavy reversing gear being at the opposite side of the wheel with the climbing tendency, it is seen that said bull-wheel must carry all the weight, there being but little weight imposed upon the steering wheel and the wheel 16.

The motor H, it will be observed, lies parallel to the face of the bull-wheel so as to better balance its weight and that of the reversing gears 2, 3, as equally as possible upon said wheel; this being aided by the weight of the radiator at 14.

It is observed, further, that the motor in order to be readily geared back to the bull-wheel and placed as close to the latter as possible, and also in order to make use of its weight, is placed so as to parallel the face of the said wheel. The disposal of these weights is an advantage as outlined, this disposal being apparently new in the art.

Having thus described the invention, we claim:—

1. In a tractor, in combination, a frame and a traction wheel supporting the same including a gear fixed relatively to it, a motor mounted upon the frame forward of the traction wheel, a speed reducing gear train intermediate the gear of the traction wheel and that of the motor and operatively engaging both, the weight of the motor and gearing being disposed close to the said wheel.

2. In a tractor, in combination, a traction wheel, a main frame mounted thereon, a gear fixed relatively to said wheel, a motor forward of the wheel parallel to its face, a speed reducing gear-set interposed between the motor and the wheel and operatively engaging both, the said motor and the said gear-set being disposed adjacent the traction wheel whereby in the operation of the machine the weight of the said motor, the gearing and the frame are substantially balanced upon and supported by said traction wheel.

3. In a tractor, in combination, a main frame, a traction wheel supporting said frame including a gear fixed relative to it, a motor lying forward of said wheel parallel to its face, a speed reducing gear-set and a reversing gear-set interposed between the said gear and the motor and operatively engaging both, the two sets and the motor being disposed upon the frame at said traction wheel so that the center of gravity of the weights of the parts mentioned are substantially balanced upon the latter.

4. In a tractor, in combination, a main frame, a traction wheel supporting said frame including a gear fixed relative to it, a motor lying forward of said wheel parallel to its face, a speed reducing gear-set and a reversing gear set interposed between the said gear and the motor and operatively engaging both, the two sets and the motor being disposed upon the frame at said traction wheel so that the center of gravity of the weights of the parts mentioned are substantially balanced upon the latter, a second wheel at one side of the frame, and a front steering wheel at the forward side of said frame.

5. In a tractor, the combination with its main frame, and a traction wheel including a gear, of a secondary frame structure extending transversely of the main frame forward of the wheel, a motor mounted on said secondary frame and having its shaft disposed parallel to the face of the wheel, a reducing gear-set and a reversing gear-set mounted upon the machine frame and interposed between the motor and the traction wheel and operatively engaging both, portions of the gearings being disposed at opposite sides of the traction wheel, the motor and the said gearing being disposed with reference to the wheel whereby in the operation of the motor in the field the weights are thrust upon and substantially balanced upon the said wheel.

6. In a tractor, the combination with its main frame, a traction wheel including a gear, of a cross-frame structure forward of the traction wheel and supported upon the main frame adjacent the face of the traction wheel, one end of the said frame structure being spaced from one side of the main frame, means extending across and secured to said main frame beneath the said frame structure for supporting it, a motor mounted upon the frame structure including its drive shaft and a gear, the latter depending within the space between the said frame structure and the main frame substantially in a horizontal line with the axis of rotation of the traction wheel, longitudinal frame members lying substantially parallel to the plane of the traction wheel, a reducing gear-set mounted upon the main frame and said longitudinal frame members, said gear-set being interposed between the gear of the motor shaft and that of the traction wheel and engaging both, the gear of the set engaging that of the motor shaft lying in the space between the cross-frame structure and a portion of the said main frame.

7. In a tractor, the combination with a traction wheel, a frame mounted upon and supported by it, a gear fixed relatively to the traction wheel, a shaft extending substantially parallel to the face of the wheel and extending beyond each side of the same, a reducing gear-set operatively engaging one end of the shaft and the described gear of the traction wheel, a motor lying forward of the traction wheel, a reversing gear-set interposed between the motor shaft and the opposite end of the first described shaft, the weights of the described motor and gearings thus disposed being placed upon the traction wheel in the operation of the tractor in the field.

8. In a tractor, the combination with a traction wheel including a gear fixed relatively thereto, and a main frame, of an auxiliary frame portion lying close to and substantially parallel to the plane of the wheel, a cross frame structure forward of the wheel, a motor mounted upon the said cross frame structure with its shaft substantially parallel to the face of the wheel, a shaft mounted upon the frame forward of and parallel to the face of the wheel, a reversing gear-set placed between the motor shaft and one end of the last described shaft, a reducing gear-set at the other end of the last described shaft operatively engaging the gear of the traction wheel, the described gear-sets being disposed at opposite sides of the traction wheel whereby they, together with the motor in operation will be substantially balanced upon and thrust upon the said traction wheel.

In testimony whereof we affix our signatures, in presence of two witnesses.

GEORGE McFARLAND.
CECIL F. LOOMIS.

Witnesses:
L. E. SUTHERLAND,
L. M. THURLOW.